2,903,465
EPOXIDATION

Hans A. Suter and Stone D. Cooley, Corpus Christi, Tex., assignors to Celanese Corporation of America, New York, N.Y., a corporation of Delaware No Drawing. Application December 6, 1956
Serial No. 626,580

12 Claims. (Cl. 260—348.5)

This invention relates to a process for epoxidizing olefinic compounds.

It is common to epoxidize olefinic compounds by reacting them with peroxygen compounds, such as peracids. One such process which has come into general use is the "in-situ process" in which the olefinic compound is reacted with a carboxylic peracid which has been formed in situ in the reaction mixture from the corresponding carboxylic acid and hydrogen peroxide or other peroxidizing agent. Processes of this type are disclosed in the article by R. J. Gall and F. P. Greenspan in "Industrial and Engineering Chemistry" 47, 147 (1955), in U.S. Patent 2,485,160 of Niederhauser and Koroly and in Bulletin No. 69 of October 1955, issued by the Becco Chemical Division, Food Machinery and Chemical Corporation. While the epoxidation processes of the prior art have been practical and have been used commercially for the production of various epoxy compounds, they have required unduly long reaction times and have usually resulted in products whose oxirane oxygen contents are not as high as desired.

It is therefore an object of this invention to provide an improved process of epoxidation.

A further object of this invention is to improve the prior art methods of epoxidation so as to increase the rate and extent of epoxidation in such methods.

Other objects of this invention will be apparent from the following detailed description and claims. In this description and claims all proportions are by weight unless otherwise indicated.

In accordance with this invention water is removed from the reaction mixture during the epoxidation reaction of the olefinic compound with the peroxy compound. In a particularly advantageous embodiment of the invention, the epoxidation reaction is carried out using the "in-situ process" described above and the water is removed from the reaction mixture by azeotropic distillation. It is found that by such removal of water the reaction time is reduced considerably (for example, to less than half the reaction time necessary in the prior art processes) while the oxirane content of the product obtained, even in this shorter time, is higher than generally obtained using otherwise similar prior art processes in which water is not removed during the reaction.

While the process of this invention may be applied to epoxidation of olefinic compounds generally, it finds its greatest utility in the epoxidation of olefinic esters such as esters of unsaturated aliphatic acids and esters of unsaturated alcohols. Examples of suitable esters of this type are glyceride oils, e.g. soybean oil or cottonseed oil; aliphatic acid esters of other polyhydric alcohols, e.g. the 1,2-propylene glycol, 1,3-butylene glycol, ethylene glycol, and pentaerythritol esters of oleic and linoleic acids; aliphatic acid esters of monohydric alcohols, e.g. methyl, ethyl, propyl, butyl and octyl esters of unsaturated fatty acids; and unsaturated alcohol esters, such as oleyl, linoleyl or linolenyl adipates. It is preferred, of course, that the olefinic materials treated be free of groups which would interfere with the epoxidation reaction.

When the "in situ process" is employed, the reactive acid and the peroxidizing agent which reacts therewith in situ to form a peracid may be any of those commonly employed for this purpose; for example, the acid may be a lower fatty acid such as acetic, propionic or formic acid, or a dicarboxylic acid such as adipic acid, and the peroxidizing agent may be hydrogen peroxide. When acetic acid is used, the reaction is generally conducted in the presence of a catalyst which promotes the formation of peracetic acid. Any of the catalysts known to the art for this purpose may be used, e.g. sulfuric acid or a sulfonic type cation-exchange resin, or similar acid catalyst. Usually the reaction mixture forms two phases, an oily phase comprising the olefinic compound and an aqueous phase containing the peroxidizing agent, the acid and the resulting peracid. These phases are agitated together during the reaction.

If, as is generally the case, it is desired that the epoxidation of the olefinic double bonds be as complete as possible, the amount of hydrogen peroxide or other peroxidizing agent should be at least stoichiometrically equivalent to the amount of olefinic compound present, i.e. at least one molecule of hydrogen peroxide per olefinic double bond. Preferably an excess of hydrogen peroxide, e.g. a 5 to 50% excess is employed. The amount of carboxylic acid used is desirably in the range of about 0.15 to 1.00, preferably 0.40 to 0.60, equivalent of acid per mole of hydrogen peroxide. Where a catalyst is used, its proportion may be varied; thus, when operating with acetic acid and 50% aqueous hydrogen peroxide, 2 to 10% by weight of a strongly acidic cation exchange resin (as dry resin) and ¼ to 1% of $H_2SO_4$ have given very good results; these proportions of acidic catalyst are based on the combined weight of acetic acid and aqueous hydrogen peroxide.

The azeotropic removal of water is accomplished by incorporation of an azeotrope-forming solvent into the reaction mixture and the distillation of the water-solvent azeotrope during the reaction. Solvents which are inert under the conditions of the reaction, e.g. hydrocarbon solvents such as benzene, isoheptane and hexane, are preferred. While the incorporation of hydrocarbon solvents in epoxidation reactions is itself not new, it has previously been the practice to carry out the reaction without distillation or under reflux so that water was not removed during the reaction; this does not produce the rapid epoxidation, and the high degree of epoxidation, attained by the practice of the present invention.

In one particularly suitable method for carrying out the present invention the vapors of the water-solvent azeotrope are condensed and allowed to separate into two phases and the solvent phase is returned to the reaction mixture. In some cases it may be necessary to carry out the reaction at a subatmospheric pressure in order that distillation of the azeotrope may take place at the desired reaction temperature.

When hydrogen peroxide and acetic acid are used there is often a tendency for these materials to distill over with the water-solvent azeotrope. However, loss of these materials may be prevented by use of an intermediate condensation zone, such as a rectification column, which condenses the hydrogen peroxide and acetic acid and effects their return to the reaction mixure, without condensing a great deal of the water-solvent azeotrope. In this case, the return of the separated solvent phase, previously mentioned, to the reaction mixture may be effected by feeding said solvent phase, as reflux to, the top of this rectification column. The loss of the hydrogen peroxide by distillation may also be compensated for by the use of a stoichiometric excess thereof, e.g. a 10 to 30% excess, in the initial charge or, if desired, by periodic addition of the hydrogen peroxide during the reaction. If desired, losses of acetic acid may be compensated for in the same manner.

The temperature at which the epoxidation reaction is carried out may be varied, as desired. For example in the in-situ process using acetic acid a suitable temperature range is about 40 to 100° C., preferably about 60 to 100° C. In this range a temperature of 90° C. causes a more rapid reaction than, say, a temperature of 80° C. but the duration of heating at the higher temperature is more critical since once the optimum degree of epoxidation has been attained further heating at the higher temperature results in a relatively rapid decrease in the oxirane content of the product; accordingly a temperature of about 75–85° C. is most suitable.

The hydrogen peroxide used in the reaction is preferably supplied as an aqueous solution thereof, e.g. a solution of 30 to 50%, or higher concentration. Although the more concentrated solutions, such as the 90% solution of hydrogen peroxide, may be employed in the practice of this invention, the handling of 90% hydrogen peroxide is hazardous and it is therefore preferred to use less concentrated solutions.

The products of the reaction may be separated from the reaction mixture in conventional manner, as by neutralizing the reaction mixture with dilute (e.g. 2%) aqueous sodium hydroxide, followed by filtration or settling to remove the catalyst and washing with dilute aqueous neutral salt solution, such as an 0.5 to 5% solution of sodium chloride or sodium sulfate, until the washing solution is neutral, and then distilling off the solvent and water under vacuum.

The following examples are given to illustrate this invention further.

Example I

A reaction vessel equipped with a stirrer, decanting head and condenser is charged with 1180 parts (3.0 moles) of the mixed isooctyl esters of oleic and linoleic acids (the iodine number of the mixed ester being 92.5), 90 parts (1.5 moles) of glacial acetic acid, 10 parts (on a dry basis) of sulfonic acid type cationic exchange resin in the hydrogen form (Dowex 50X–8) and 410 parts of benzene. The mixture is heated to 60° C. and then 388 parts (5.7 moles) of aqueous 50% hydrogen peroxide are added gradually over a period of 4 minutes, while stirring constantly. The temperature of the resulting mixture is allowed to rise to 80° C. within 15 minutes counted from the first addition of hydrogen peroxide. At this temperature the pressure in the reaction vessel is reduced to 510 mm. Hg absolute so that an azeotrope of water and benzene (said azeotrope containing 8.8% water) distills off. The distillate is collected in the condenser and decanting head and the water phase thereof is withdrawn while the benzene is returned to the reaction mixture. After 2½ hours (counted from the first addition of hydrogen peroxide) no more water comes over as an azeotrope with the benzene, so that practically all water has been removed from the reaction mixture. The product, after isolation from the cation exchange resin, acetic and peracetic acid and solvent, has an oxirane oxygen content of 4.13%.

Example II

Example I is repeated, using the following proportions of reactants, solvent and catalyst:

1.0 mole of the isooctyl ester of the mixture of oleic and linoleic acids known as "Acintol FA-2," said ester having an iodine number of 92.5; 0.75 mole glacial acetic acid; 2.25 moles of aqueous 50% hydrogen peroxide; 2% (based on the weight of the acetic acid and aqueous hydrogen peroxide) of the strongly acidic sulfonic type cationic exchange resin used in Example I; and 26%, based on the weight of the other materials charged (21% based on the total weight) of benzene.

The isolated product has an oxirane oxygen content of 4.33% and an iodine number of 1.5.

Example III

Example II is repeated except that n-hexane is substituted for the benzene. Since the azeotrope of water and n-hexane (containing 5.5% water) distills at atmospheric pressure at the reaction temperature of 80° C. no subatmospheric pressure is used, the entire reaction being conducted at atmospheric pressure. The isolated product, after 4 hours of reaction, has an oxirane oxygen content of 4.2 and an iodine number of 1.4.

Example IV

Example I is repeated using the following proportions of reactants, solvent and catalyst:

1.0 mole of isooctyl oleate (iodine number 64.5)
0.5 mole glacial acetic acid
1.25 moles aqueous 50% hydrogen peroxide
2% (based on the weight of acetic acid and aqueous hydrogen peroxide) of the cation exchange resin of Example I
30% (based on the weight of the remainder of the ingredients) of benzene. (23% based on the total weight)

In this case the period for addition of the hydrogen peroxide is 3 minutes and the temperature is thereafter allowed to increase to 90° C. At this temperature the azeotropic distillation takes place at atmospheric pressure. After 1.5 hours (counting from the beginning of peroxide addition) the oxirane oxygen content of the product is 3.52% and its iodine number 1.9.

Example V

Example IV is repeated except that the cation-exchange resin is replaced by 0.5% (based on the weight of acetic acid and aqueous hydrogen peroxide) of $H_2SO_4$, added as a 50% aqueous solution thereof, and the reaction temperature is 80° C. using subatmospheric pressure as in Example I. After 2.5 hours a product having an iodine number of 0.7 and an oxirane oxygen content of 3.47 is obtained.

Example VI

Example I is repeated using the following ingredients:

1.0 mole of 1,2-propylene dioleate (iodine No. 82.1)
1.5 moles of acetic acid
2.5 moles of aqueous 50% hydrogen peroxide
2% (calculated as in Example II) of the cation-exchange resin of Example I
30% (calculated as in Example II) of benzene. (23%, based on the total weight)

After 2 hours of reaction the isolated product has an iodine number of 1.3 and an oxirane oxygen content of 4.49%. This corresponds to a conversion of over 98% and a yield of epoxy product of 91%.

Example VII

Example I is repeated using the following ingredients:

600 parts of soya oil (iodine No. 133)
100 parts (1⅔ mole) of acetic acid
250 parts (3.68 moles) of aqueous 50% hydrogen peroxide
10.5 parts of the cation-exchange resin of Example I
200 parts of benzene After 3 hours of reaction the isolated product has an iodine number of 0.7 and an oxirane oxygen content of 6.41%.

Example VIII

Example IV is repeated using isodecyl oleate (iodine No. 62.5) in place of the isooctyl oleate. After 2.5 hours of reaction the isolated product has an iodine number of 1.9 and an oxirane oxygen content of 3.23%.

It is to be understood that the foregoing detailed description is merely given by way of illustration and that many variations may be made therein without departing from the spirit of our invention.

Having described our invention, what we desire to secure by Letters Patent is:

1. In the in-situ process of epoxidizing an ester of an olefinic higher aliphatic acid by reaction of said ester with an aqueous peracid formed in situ by the reaction of aqueous hydrogen peroxide and the corresponding carboxylic acid, the improvement which comprises removing water from the reaction mixture by azeotropic distillation with an inert entrainer during said epoxation reaction.

2. Process as set forth in claim 1 in which said higher aliphatic acid is a fatty oil acid, said carboxylic acid is acetic acid and an acid catalyst for peracetic acid formation is present in said reaction mixture.

3. Process as set forth in claim 1 in which said reaction mixture contains a water-immiscible hydrocarbon solvent for said ester, said solvent forming an azeotrope with the water, and in which said azeotrope is distilled continuously from said reaction mixture.

4. In the in-situ process of epoxidizing an ester of an unsubstituted alcohol and an acid of the group consisting of oleic and linoleic acid with aqueous peracetic acid formed in situ by the reaction of aqueous hydrogen peroxide and acetic acid in the presence of an acid catalyst for peracetic acid formation, the improvement which comprises incorporating in the reaction mixture an inert volatile hydrocarbon forming an azeotrope with water and removing water by continuous distillation of said azeotrope during said epoxidation reaction at a temperature of about 60 to 100° C.

5. Process as set forth in claim 4 in which said alcohol is an alkanol.

6. Process as set forth in claim 4 in which said alcohol is a polyhydric alcohol.

7. Process as set forth in claim 4 in which the solvent is selected from the group consisting of benzene, isoheptane and hexane.

8. In the in-situ process of epoxidizing an olefinic compound by reaction of said olefinic compound with an aqueous carboxylic peracid formed in situ by the reaction of hydrogen peroxide and the corresponding carboxylic acid, the improvement which comprises removing water from the reaction mixture by azeotropic distillation with an inert entrainer during said epoxation reaction.

9. Process as set forth in claim 8, wherein said olefinic compound is an olefinic ester.

10. Process as set forth in claim 8 wherein said inert entrainer is a volatile hydrocarbon.

11. Process as set forth in claim 8 in which said entrainer is a water-immiscible solvent and solvent is added to said reaction mixture to replace the solvent lost by said distillation.

12. Process as set forth in claim 11 in which distilled azeotrope is condensed and separated into phases and the solvent phase of said azeotrope is returned to the reaction mixture during the reaction.

References Cited in the file of this patent

UNITED STATES PATENTS

| | | |
|---|---|---|
| 2,458,484 | Terry et al. | Jan. 4, 1949 |
| 2,485,160 | Niederhauser et al. | Oct. 18, 1949 |
| 2,692,271 | Greenspan et al. | Oct. 19, 1954 |
| 2,774,774 | Greenspan et al. | Dec. 18, 1956 |
| 2,801,253 | Greenspan et al. | July 30, 1957 |
| 2,810,732 | Greenspan et al. | Oct. 22, 1957 |